United States Patent [19]

Ott et al.

[11] 4,091,186

[45] May 23, 1978

[54] DRY CELL BATTERY HAVING ELECTRICAL SPRING CONTACT ADHERED TO TERMINAL

[75] Inventors: John J. Ott; Thomas F. Ward; Richard D. Cyr, all of Appleton, Wis.

[73] Assignee: ESB Incorporated, Philadelphia, Pa.

[21] Appl. No.: 849,034

[22] Filed: Nov. 7, 1977

[51] Int. Cl.² .............................................. H01M 6/42
[52] U.S. Cl. .................................... 429/157; 429/158; 429/178
[58] Field of Search ................ 429/157, 158, 160, 178, 429/162, 218, 225, 229

[56] References Cited

U.S. PATENT DOCUMENTS 3,891,462  6/1975  Longkau ............................... 429/157

*Primary Examiner*—Charles F. LeFevour
*Attorney, Agent, or Firm*—Raymond L. Balfour

[57] ABSTRACT

A spring contact is compressed against and electrically connected to a terminal of a dry cell battery, and the spring-like compressive force between the contact and the terminal is maintained by an adhesive. The spring contact and adhesive may be used with both single cell and multicell batteries. The spring may be situated between two cells of a multicell battery, with the adhesive adhering the two cells together and maintaining the spring-like compressive force between the contact and the terminals of the adjacent two cells. The terminal which is electrically connected with the spring contact may be a thin foil of metal, and the inner surface of the foil may serve as the negative electrode of a cell; the foil may be a metal selected from the group consisting of a zinc, magnesium, lead, aluminum and alloys thereof. The spring contact may have a burr where it electrically connects with the terminal. Where used between adjacent cells, the spring contact may be soldered or welded to the terminal of one of the cells. The spring contact may be compressed against and electrically connected to the outer terminal of an end cell in a multicell battery. A variety of adhesives, including hot melts and pressure sensitive adhesives, may be used.

24 Claims, 16 Drawing Figures

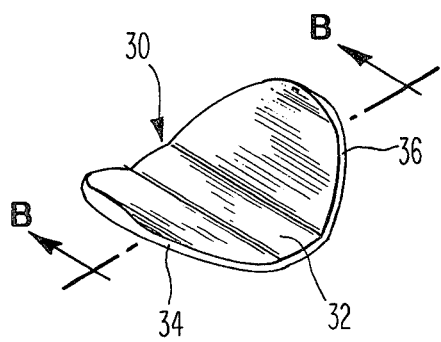
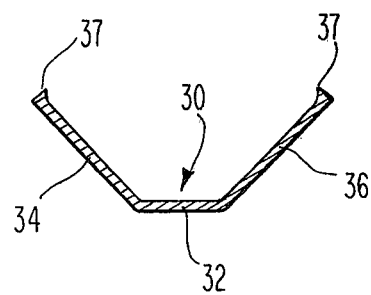
Fig. 6A  Fig. 6B
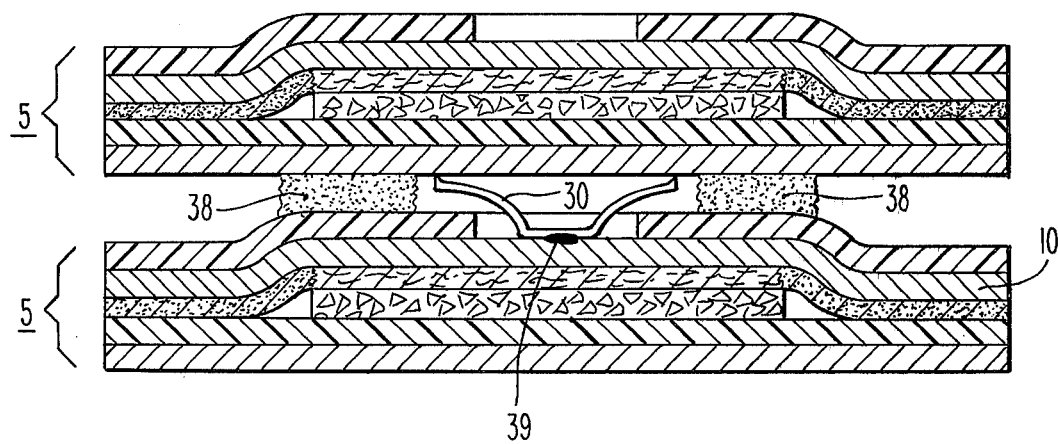
Fig. 7

DRY CELL BATTERY HAVING ELECTRICAL SPRING CONTACT ADHERED TO TERMINAL

BACKGROUND OF THE INVENTION

Systems have long been needed to maintain good electrical conductivity between terminals of dry cell batteries and electrical contacts connected to them. The need exists at the terminals of single cell batteries, at the end terminals of multicell batteries, and between the cells of multicell batteries.

Multicell dry batteries have long been assembled by stacking individually constructed flat cells one above another and electrically connecting them in series. The electrical connections between adjacent pairs of cells have involved a variety of constructions including leaf springs, projecting point contacts, and others. To assure continued electrical intercell connection and to minimize the electrical resistance across the connection it has been common to maintain the stack of cells in compression by wrapping or surrounding them with tapes, bands, straps and shrinking encapsulators. As the thickness of the individual cells decreases, however, the practicality of using tapes, bands, straps or encapsulators diminishes.

In multicell batteries having extremely thin cells, the use of such tapes, bands, straps and encapsulators has been abandoned altogether and adjacent cells as well as the layers within each cell have been adhered together by various adhesives, gels, bonding agents, and other materials; see for example the constructions shown in U.S. Pat. Nos. 3,770,504 and 3,617,387. In general the constructions shown in these and other references have required the adhesives to be electrically conductive, since the adhesives served the additional function of being the intercell connections. Where this was not the case, the adhesives performed the single function of adhering layers together while some other component was utilized to make the intercell electrical connection, and that other component was not under compression.

SUMMARY OF THE INVENTION

With this invention a spring contact is compressed against and electrically connected to a terminal of a dry cell battery comprising one or more cells, and the springlike compressive force between the contact and the terminal is maintained by an adhesive.

In a multicell battery the spring contact may be situated between two cells of the battery where it electrically connects the confronting terminals of adjacent cells, with the adhesive causing the contact to exert a spring-like compressive force against both terminals.

While this invention may be used with cylindrical and button cells in which the seal is usually accomplished by crimping, the invention is particularly useful in the thin, flat batteries where seals are achieved with adhesives or heat seals. In these very thin batteries the terminal which is electrically connected with the spring contact may be a thin foil of metal, and the inner surface of the foil may serve as an electrode of a cell. Where the foil is to serve as the negative electrode, the metal may be selected from a group consisting of zinc, magnesium, lead, aluminum and alloys thereof.

To maintain good electrical conductivity between the spring contact and the cell terminal the spring contact may have a burr which makes sharp contact with, but does not perforate, the terminal. Where used between adjacent cells, the spring contact may be soldered or welded to the terminal of one of the cells to maintain good conductivity with that cell.

The spring contact may be compressed against and electrically connected to the outer terminal of an end cell in a multi-cell battery.

A conductor may be electrically connected to the spring contact and wrapped around an edge of the battery. This feature, which may be used in both single cell and multicell batteries, makes it possible to have both the positive and negative terminals on the same side of the battery, comparable to the construction shown in U.S. Pat. No. 3,734,780.

A variety of adhesives, including hot melts and pressure sensitive adhesives, may be used.

BRIEF DESCRIPTION OF THE DRAWINGS

FIG. 6A is a pictorial view of a spring-like electrical contact, while

FIG. 6B is a cross-section of the contact taken along the line B—B of FIG. 6A.

FIG. 7 is a cross section of two flat dry cells of the type appearing in FIG. 2 joined together by an adhesive and electrically connected in series by the electrical contact shown in FIGS. 6A and 6B.

Figure 1:
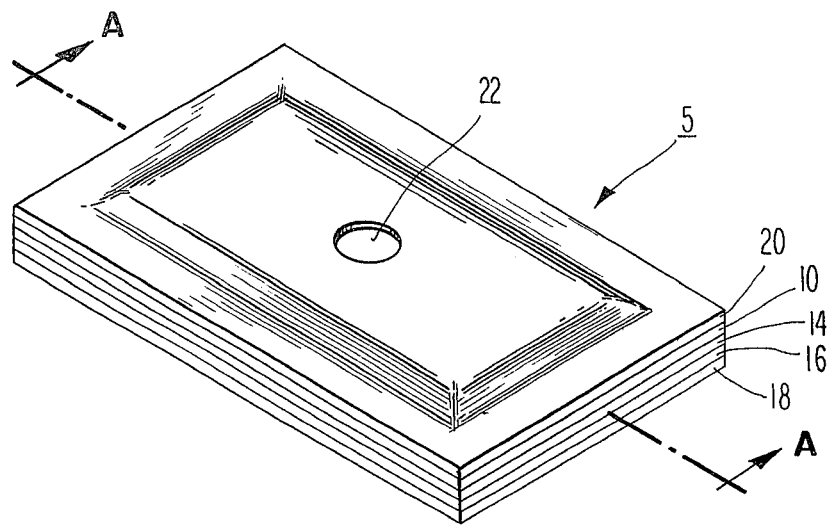
FIG. 1 is a pictorial view of a flat dry cell battery.

Thicknesses of the materials have been exaggerated in the drawings for purposes of illustration.

DESCRIPTION OF THE PREFERRED EMBODIMENTS

FIG. 1 shows a dry cell battery 5 having only one cell.

Figure 2:
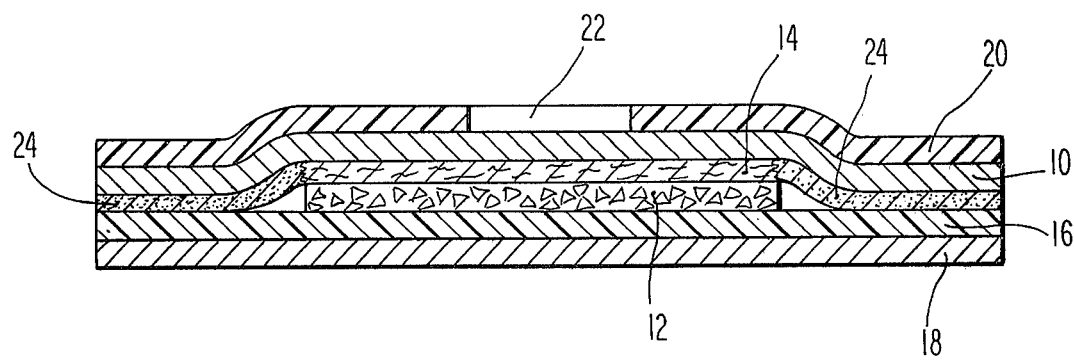
FIG. 2 is a cross-section taken along line A—A of FIG. 1.

Referring to FIG. 2 where the cell 5 of FIG. 1 is shown in cross-section, the cell comprises a metallic foil anode 10, a cathode 12, and an electrolyte-containing layer 14 between the anode and cathode. Beneath the cathode 12 is a layer of electrically conductive plastic 16, e.g., Condulon, and beneath and joined to the plastic 16 in a metal foil 18 which may be tin plated steel. Above the anode 10 is a layer of electrically nonconductive plastic 20 having an opening 22 in the center. It will be noted from FIG. 2 that the layer 14 extends beyond the edges of the cathode 12 to the outer edges of the battery, and these extensions of layer 14 are impregnated with an electrically nonconductive adhesive 24 which bonds the anode 10 with the electrically conductive plastic 16 to provide a peripheral seal system for the battery. The plastic 20 is preferably sealed to the outer face of the metal 10 to prevent escape of moisture from the cell. In the construction shown in FIG. 2, the inner face of the metal foil 10 is electrochemically active and serves as the anode or negative electrode for the cell, while the outer face of the foil 10 serves as the negative terminal for the cell by being exposed through the opening 22. The metal layer 18 at the bottom of the cell serves as the positive terminal for the cell.

Figure 3:
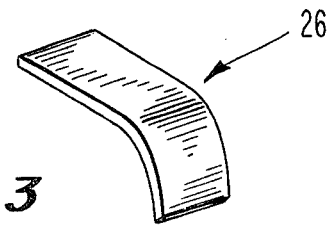
FIG. 3 is a pictorial view of a spring-like electrical contact.
Figure 4:
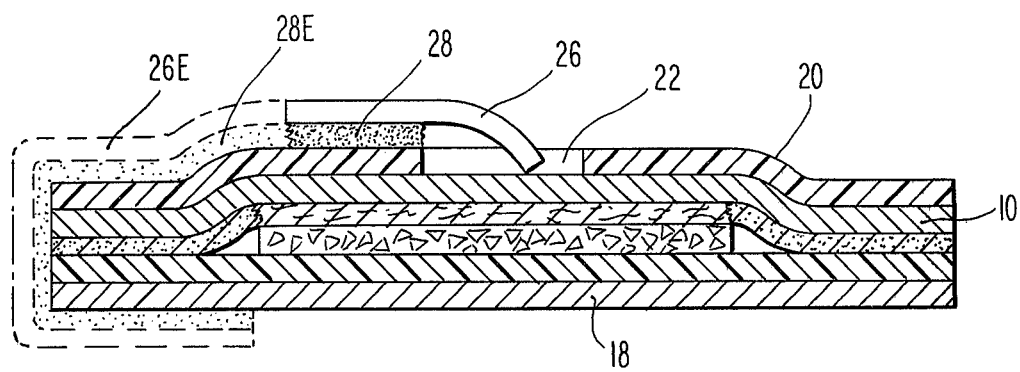
FIG. 4 shows the battery of FIG. 2 together with the contact of FIG. 3 and a deposit of adhesive.

FIG. 3 is a pictorial view of a leaf or tongue-shaped, spring-like electrical contact 26 one end of which deflects downwardly. FIG. 4 shows the battery of FIGS. 1 and 2 together with a deposit of adhesive 28 between the contact 26 and the outer surface of the plastic 20. The downwardly depending end of the contact 26 extends through the opening 22 in plastic 20 where it is in physical contact and electrical connection with metal foil 10, the outer surface of which functions as the negative terminal of the battery. The dimensions and properties of the contact 26 and adhesives 28 are such that the adhesive maintains the spring contact 26 so that the end of the contact 26 exerts a spring-like compressive force against the terminal of the battery.

Also shown in FIG. 4 are phantom lines 26E designating an extension of contact 26 or an electrical conductor electrically connected to contact 26. This extension 26E is wrapped around the edges to the bottom of the battery where it can function as an extension of the negative terminal, thereby causing both terminals (or extensions thereof) to be on the same face or side of the battery. Between extension 26E is a layer of adhesive 28E, an extension of adhesive 28, which is optional. If extension 26E is not otherwise electrically insulated from the side edge of the battery and from positive terminal 18, layer 28E can function as an insulator in addition to or in substitute for the adhesive. This wrapped-around terminal, which is similar in some respects to that shown in U.S. Pat. No. 3,734,780, is an optional feature which may conveniently be used with the spring-like electrical contact and the adhesive of this invention.

Figure 5:
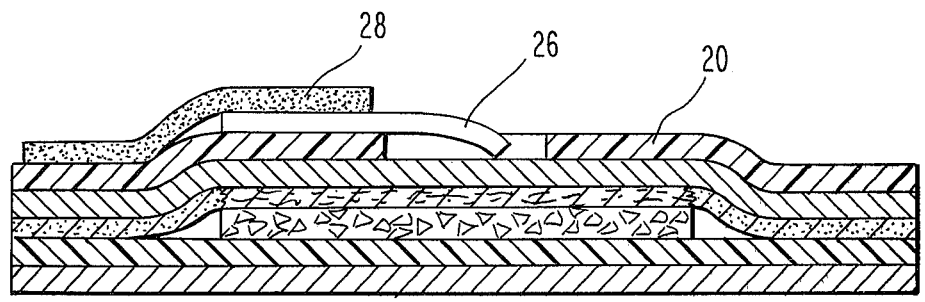
FIG. 5 is a variation of FIG. 4.

FIG. 5 shows a variation of the construction illustrated in FIG. 4, one in which the adhesive 28 extends over the top of the contact 26 like an adhesive bandage rather than being situated between the contact and plastic layer 20. The adhesive 28 should preferably extend beyond three edges of the contact 26 to be adhered to the plastic 20, leaving only the downwardly depending tongue or end of the contact extending beyond the edge of the adhesive.

FIGS. 6A and 6B show a spring-like electrical contact 30 having a different design and configuration. The contact 30 is shown having a central section 32 flanged on both sides by upwardly projecting arms or projections 34 and 36. The contact 30 is made from a metal which permits arms 28 and 30 to act as cantilevered springs, that is to deflect downwardly when subjected to a downward force but to spring back to original position if the force is later removed.

FIG. 7 shows in cross-section a battery comprising two of the flat dry cells 5 of the type appearing in FIGS. 1 and 2. The two cells are joined together by deposits of adhesive 38 situated between them and are electrically connected in series by the electrical contact 32 which fits through the opening 22 of the lower cell and makes electrical contact with both the negative termial of the lower cell and the positive terminal of the upper cell. During the battery assembly process, the two cells are to be pressed together by a force which compresses and deflects the arm 34 and 36 of the contact 30 and causes the contact to exert a spring-like force against the two terminals. Depending upon the properties of the particular adhesive 38 being used, it may be necessary or desirable to maintain this pressure during the assembly process for a period of time sufficient to permit the adhesive to undergo a curing or setting process. It is a requirement of the present invention that the adhesive 38 have sufficient strength, both adhesive and cohesive strength, to maintain the contact in such compression after the pressure applied during the assembly process is released. Thus the good electrical conductivity achieved by a spring contact is maintained without the application of pressure from tapes, bands, straps, or shrinking encapsulators.

Optional features which may be added to the construction shown in FIG. 7 are spring contacts and wrapped around terminals comparable to those shown in FIGS. 4 and 5.

Figure 8:
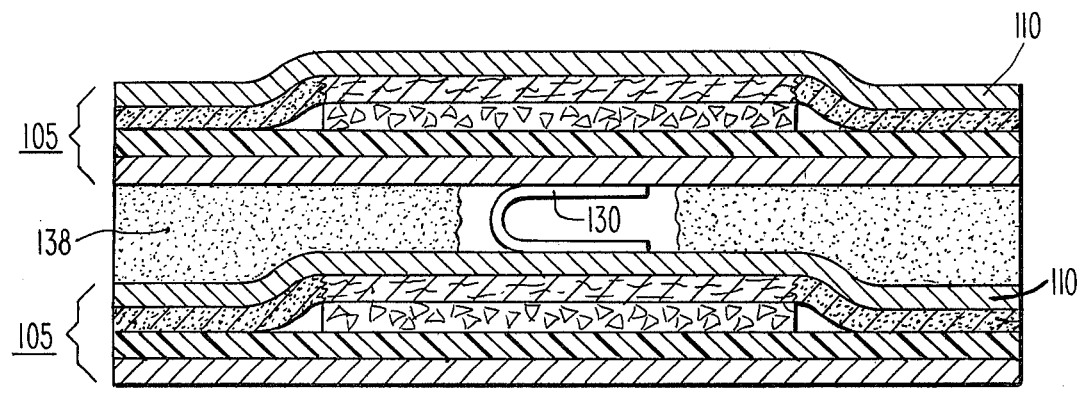
FIGS. 8, 9 and 10 are cross-sections showing alternative constructions of dry cells and spring-like electrical contacts.

FIG. 8 shows a two cell battery embodying the concepts of the present invention but having construction details which differ in several respects from those shown in FIGS. 1 through 7. Referring to FIG. 8, the pair of dry cells 105 have metallic foil anodes 110 which extend outwardly to the edges of the battery. Unlike the cells shown in FIGS. 1, 2, 4, 5 and 7, the cells 105 do not have a layer of plastic comparable to layer 20 extending over the metal foils 110. The adhesive 138 which joins the two cells 105 together extends outwardly out to the edges of the battery. The electrical contact 130 which electrically connects the two cells 105 together is shown in FIG. 8 having a horseshoe shape.

Figure 9:
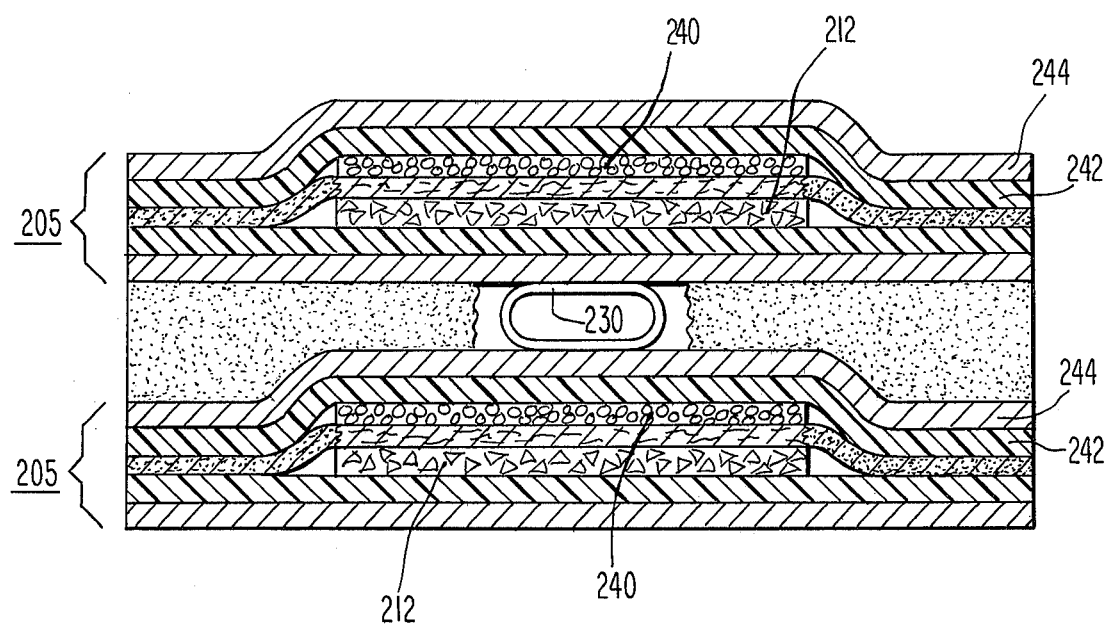

FIG. 9 shows still another multicell battery embodying the concepts of the present invention but having construction details which differ in several respects from those shown in FIGS. 7 and 8. Referring to FIG. 9, the pair of dry cells 205 have anodes 240 comprising particles of zinc or other metal, and these anodes have horizontal dimensions comparable to those of the cathodes 212. A composite of electrically conductive plastic 242 and metal foil 244, identical in composition to the layers 16 and 18, respectively, shown in FIG. 2 extends across the tops of the cells 205 and outward to the edges of the battery to serve as negative terminals for the cells. In contrast to the constructions shown in FIGS. 2, 4, 5, 7, and 8 where the metal foils 10 and 110 serve as both negative electrodes and negative terminals for their cells, the construction illustrated in FIG. 9 shows how the negative electrode or anode 240 may be a component which is separate and distinct from the negative terminal. The electrical contact 230 which electrically connects the two cells 205 together is shown in FIG. 9 having an oval or eliptical shape.

It is preferred to have the negative terminal which is in electrical connection with the contact be a thin foil of metal, the inner surface of which is the negative electrode for the cell of which it is a component. Examples of this preferred construction are shown in FIGS. 2, 4, 5, 7, and 8. Compared with constructions in which the negative terminal and the negative electrode or anode are different components, as in FIG. 9, the preferred foils permit thinner and less expensive constructions. Preferably the foil is a metal selecteds for the particular electrochemical system desired in the cells and battery. Thicker strips of the same metals, having sufficient thickness and rigidity so that they may not be regarded as foils, may also be used.

Figure 10:
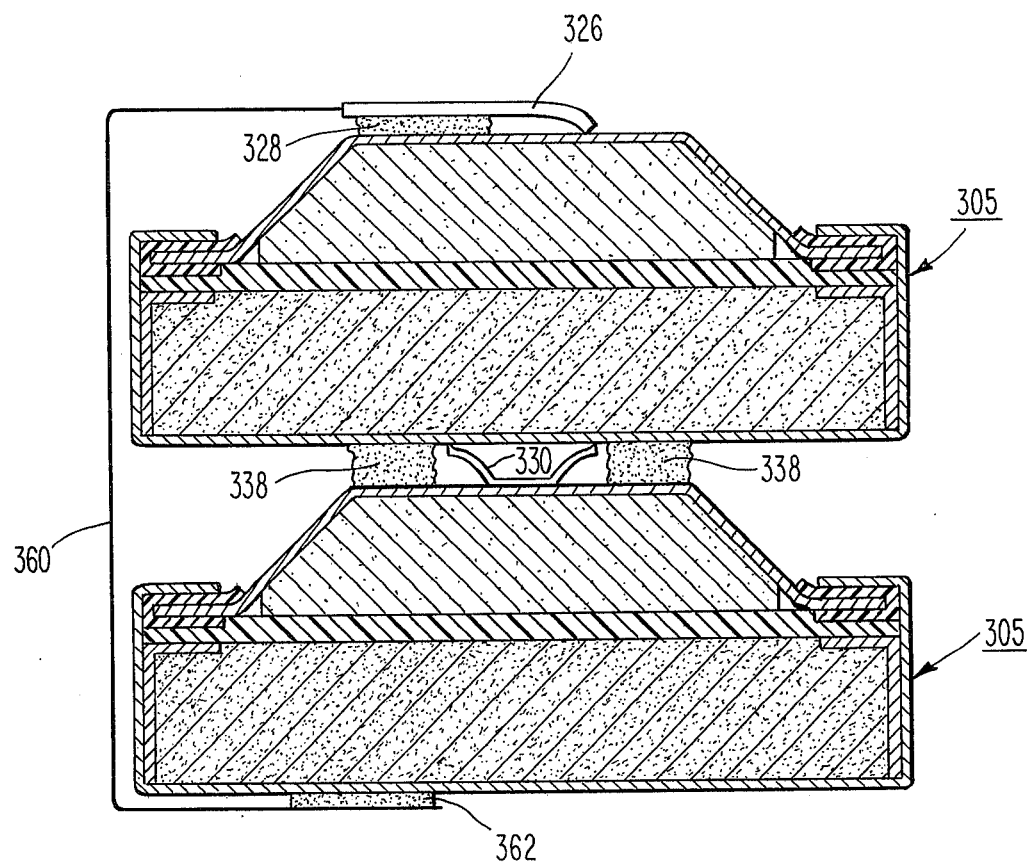

FIG. 10 illustrates how a pair of conventional button cells 305 may utilize the principles of this invention. Between the two cells are spring-like contact 330 and adhesive 338 comparable to contact 30 and adhesive 38 shown in FIG. 7. At the top of the uppermost cell are a spring-like contact 326 and adhesive 328 comparable to contact 26 and adhesive 28 shown in FIG. 4. An insulated but electrically conductive wire 360 extends around the sides of the cells to the bottom of the battery where it is tacked or adhered in place by a deposit of adhesive 362, thus providing the battery with the wrapped around terminal option.

Figure 11:
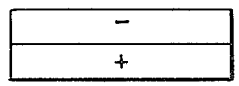
FIG. 11 is a schematic illustration of a dry cell battery.

FIG. 11 is a schematic illustration of a dry cell battery, which may be constructed in the manner of any of the earlier views or in some other manner. The battery is shown in FIG. 11 only in terms of its positive and negative terminals.

Figure 12:
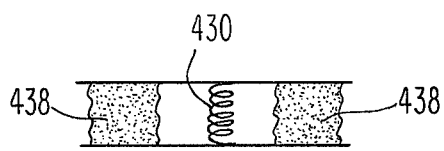
FIG. 12 is a schematic illustration of a spring-like electrical contact maintained in compression against a surface by an adhesive.

FIG. 12 is a schematic illustration of a springlike electrical contact 430 maintained in compression against a surface by an adhesive 438. The contact 430 may take the configuration of contacts 26, 30, 130, or 230 shown in FIGS. 4, 7, 8 and 9, respectively, or any other configuration. Contact 430 is intended to be illustrative of spring-like electrical contacts generally, and to be independent of particular configurations.

Figure 13:
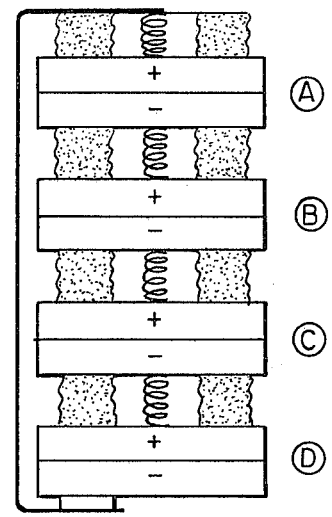
FIG. 13 is a schematic illustration of four cells stacked one above another and adhered together by an adhesive. Springlike electrical contacts which electrically connect the cells in series are held in compression against the terminals of the cells by the adhesive.

FIG. 13 is a schematic illustration of four cells A, B, C, and D stacked one above another and adhered together by adhesives. Spring-like electrical contacts which electrically connect the cells in series are held in compression against the terminals of the cells by the adhesive. Another spring-like contact is adhered to the positive terminal of cell A by an adhesive which causes that contact to exert a spring-like compressive force against that terminal, and an electrically conductive member is run from the top contact around the edge of the battery where it is tacked in place by adhesive and where it provides a wrapped-around terminal.

Figure 14:
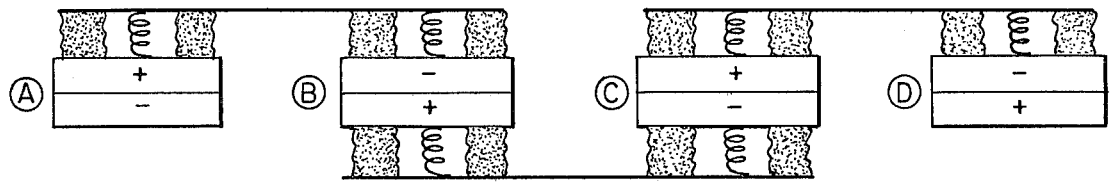
FIG. 14 is a schematic illustration of four cells horizontally spaced apart and electrically connected in series through spring-like electrical contacts which are maintained in compression against the terminals of the cells by adhesives.

FIG. 14 is a schematic illustration of four cells A, B, C, and D horizontally spaced apart and electrically connected in series through spring-like electrical contacts which are properly connected electrically and which are maintained in compression against the terminals. The battery shown in FIG. 14 is the electrical equivalent of the one shown in FIG. 13, although the two are assembled in different configurations.

Figure 15:
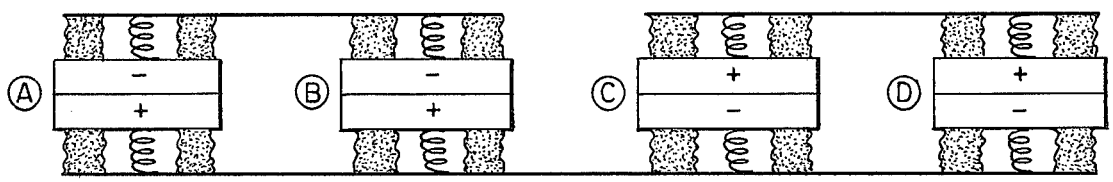
FIG. 15 is a schematic illustration of four cells horizontally spaced apart and electrically connected in a parallel/series arrangement through spring-like electrical contacts which are maintained in compression against the terminals of the cells by adhesives.

FIG. 15 is a schematic illustration of four cells A, B, C, and D horizontally spaced apart and electrically connected through spring-like electrical contacts so that cells A and B are connected in parallel, cells C and D are connected in parallel, and cells A and B are in series with cells C and D.

FIGS. 13 through 15 illustrate that the present invention may be used in a variety of ways. As intercell connectors, the spring-like electrical contacts may connect cells in series or parallel. Multicell batteries in which the cells are stacked vertically do not necessarily require simple series electrical connections; with the proper intercell electrical connections it is possible to produce a battery which is the electrical equivalent of the one shown in FIG. 15 while having the geometric configuration of the one shown in FIG. 13. Where an electrical contact is electrically connected to the terminals of two different cells, the adhesive which maintains the electrical contact in compression may be adhered to the terminals of both cells (as in FIG. 13) or to the terminal of only one cell (as in FIGS. 14 and 15). Although FIG. 13 illustrates a construction which is more economical than that of FIG. 14 in terms of the number of spring-like electrical contacts and adhesives required, the two figures illustrate how the present invention may be used to achieve batteries which are electrically equivalent but geometrically different. The designs shown in FIGS. 13 through 15 are merely illustrative of different manners of using the invention, and many more cell layouts and intercell connections are possible.

A number of other features useful with the invention should also be mentioned.

It may be desirable to have a slight burr on the electrical contact where the contact electrically connects with the terminal of a cell. The burr can cut through oxide films on the surface of the cell terminal to maintain good electrical contact without cutting through the terminal or metal foil with which it makes contact. The burr can be designed to provide an essentially point contact, or it can provide a longer knife-edge which may be of a straight, circular, or other configuration. As an example, the contact 30 shown in FIG. 6B has a burr 37 at the end of each of the arms 34 and 36 and the burrs 37, as shown in FIG. 7, make good electrical contact with the terminal of a cell. Such burrs can be produced by having more than the normally required tolerance between a punch and dye, and the burrs can have a height of up to several thousandths of an inch.

It may also be desirable to have the electrical contact soldered or welded to the outer surface of the metallic foil terminal. The soldered connection will maintain good electrical conductivity and will prevent oxidation of the surface of the foil where there is to be an interface with the contact. An example of this construction is illustrated in FIG. 7 where there is a soldered or welded connection 39 between the electrical contact 30 and the outer surface of the foil 10. In general, if a soldered or welded connection is used, it should be on the terminal that is most likely to oxidize, while the burr, which is capable of penetrating a thin oxide film, may be used to make electrical contact with the terminal less likely to oxidize. Where the electrical contact is to be secured to a cell terminal of greater thickness and rigidity, the contact may be riveted to the contact, e.g., in the construction shown in FIG. 10 the contact 330 could be riveted to the upper terminal of the lower cell.

Regardless of whether or not the contact is soldered or welded to the metal foil, but particularly if it is, it may be desirable to apply a small mask over the inner surface of the foil opposite the electrical connection between the foil and the contact. Such a mask, not shown in the drawings, will electrochemically inactivate the inner surface of the foil in the vicinity of the connection and decrease the likelihood of undesired local corrosion which might result in pinholes in the foil. For further information about the use of such masks, see U.S. Pat. No. 4,059,717.

The adhesives used in conjunction with the spring-like electrical contact must meet the requirement of maintaining the contact so that the contact exerts a spring-like compressive force against the terminal. A wide variety of commercially-available adhesives will meet this requirement, including hot melts and pressure sensitive adhesives and including also both electrically conductive and nonconductive adhesives. Where the adhesive is introduced to the terminal surface in a fluid or semi-fluid state, it may be applied as a thin patch in an area around the electrical contact surface by printing or other techniques, and the application may be made before the electrical contact is connected with the cell terminal. As an alternative to an adhesive which is applied separately, a tape having adhesive surfaces on one or both sides may be used. The concept of an adhesive is to be viewed broadly and generally. The requirement of the adhesive is that it adhere, and any material and process by which that requirement is met may be satisfactory.

Regardless of the adhesive material used, it is preferable to prevent the adhesive from physically contacting the electrical contact so that the spring-like electrical contact may flex freely to the extent that may be necessary.

The spring-like electrical contact may be made from a wide variety of metals which may be tempered to obtain and maintain the desired spring-like properties.

We claim:

1. An improvement in a dry cell battery comprising at least one dry cell, wherein the improvement comprises:
   (a) a spring contact electrically connected to a terminal of a cell in the battery, and
   (b) an adhesive which maintains the spring contact so that the contact exerts a spring-like compressive force against the terminal.

2. The battery of claim 1 in which the battery comprises only one cell.

3. The battery of claim 2 in which the terminal electrically connected with the spring contact is a thin foil of metal.

4. The battery of claim 3 in which the inner surface of the metal foil is an electrode for the cell.

5. The battery of claim 4 in which the foil is a metal selected from the group consisting of zinc, magnesium, lead, aluminum and alloys thereof.

6. The battery of claim 4 in which the contact is burred where it electrically connects with the terminal.

7. The battery of claim 3 in which the contact is burred where it electrically connects with the terminal.

8. The battery of claim 2 in which the spring-like contact is burred where it electrically connects with the terminal.

9. The battery of claim 2 in which a conductor electrically connected to the spring contact is wrapped around an edge of the battery.

10. The battery of claim 1 in which the battery comprises at least two cells.

11. The battery of claim 10 in which the spring contact is situated between two cells of the battery and electrically connects the confronting terminals of the adjacent cells, with the adhesive causing the contact to exert a spring-like compressive force against both terminals.

12. The battery of claim 11 in which the two terminals electrically connected by the contact are thin foils of metal.

13. The battery of claim 12 in which the inner surface of the metal foil comprising the negative terminal is the negative electrode for its cell.

14. The battery of claim 13 in which the foil comprising the negative terminal is a metal selected from the group consisting of zinc, magnesium, lead, aluminum and alloys thereof.

15. The battery of claim 12 in which the contact is soldered or welded to the outer surface of the metal foil comprising the negative terminal.

16. The battery of claim 15 in which the spring contact is burred where it electrically connects with the positive terminal.

17. The battery of claim 12 in which the spring contact is burred where it electrically connects with the positive terminal.

18. The battery of claim 10 in which the terminal electrically connected with the spring contact is a thin foil of metal.

19. The battery of claim 18 in which the inner surface of the metal foil is an electrode for the cell.

20. The battery of claim 19 in which the foil is a metal selected from the group consisting of zinc, magnesium, lead, aluminum and alloys thereof.

21. The battery of claim 19 in which the contact is soldered or welded to the outer surface of the foil.

22. The battery of claim 18 in which the contact is soldered or welded to the outer surface of the foil.

23. The battery of claim 10 in which the spring-like contact is burred where it electrically connects the terminal.

24. The battery of claim 10 in which a conductor electrically connected to the spring contact is wrapped around an edge of the battery.

* * * * *